United States Patent [19]
Therond

[11] Patent Number: 5,456,012
[45] Date of Patent: Oct. 10, 1995

[54] MARKING DEVICE

[75] Inventor: Marcel Therond, Miribel, France

[73] Assignee: Technifor S.A., Miribel, France

[21] Appl. No.: 188,802

[22] Filed: Jan. 31, 1994

[30] Foreign Application Priority Data

Feb. 10, 1993 [FR] France .................... 93 01699

[51] Int. Cl.$^6$ ................ B43L 9/00; B43L 13/00
[52] U.S. Cl. ................. 33/26; 33/18.2; 33/18.1; 101/4
[58] Field of Search ................ 33/18.1, 18.2, 33/26, 27.01, 32.1, 32.3; 346/139 R, 141; 400/118, 127; 101/4

[56] References Cited

U.S. PATENT DOCUMENTS

| | | | |
|---|---|---|---|
| 2,282,929 | 5/1942 | Billstein | 346/139 R |
| 2,823,591 | 11/1953 | Craddock et al. | |
| 2,950,535 | 8/1960 | Burgess | 33/26 |
| 3,173,210 | 3/1965 | Allemann | 33/18.2 |
| 3,658,286 | 4/1972 | Terai et al. | |
| 4,089,262 | 5/1978 | Sopora | 101/4 |
| 5,002,411 | 3/1991 | Therond | |
| 5,127,779 | 7/1992 | Yang | |

FOREIGN PATENT DOCUMENTS

| | | | |
|---|---|---|---|
| 0519850A1 | 12/1992 | European Pat. Off. | |
| 0703221 | 4/1931 | France | 33/18.2 |
| 2460134 | 7/1975 | Germany | 101/4 |
| 0290696 | 11/1935 | Italy | 33/18.2 |
| 5330291 | 12/1993 | Japan | 33/27.01 |

Primary Examiner—Thomas B. Will
Attorney, Agent, or Firm—Dowell & Dowell

[57] ABSTRACT

Disclosed is a marking device, wherein the two telescopic jacks which control orientation of the tool-holder rod are coupled to the wall of the fixed casing with the aid of ball-and-socket joints disposed along the plane transverse to the rod which passes through the centre of the articulated linkage supporting the rod.

1 Claim, 1 Drawing Sheet

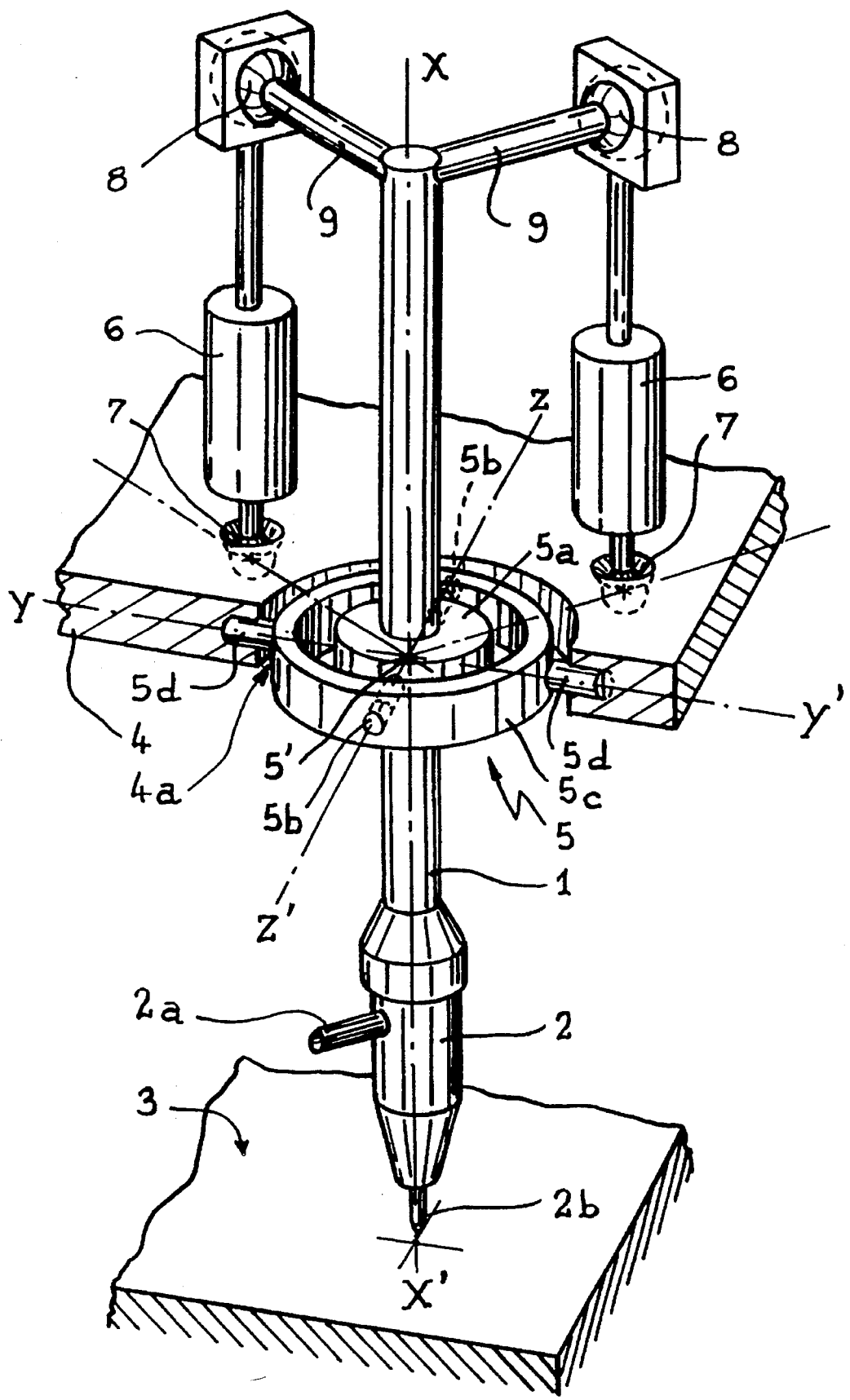

MARKING DEVICE

FIELD OF THE INVENTION

The present invention relates to marking devices for producing on the surface of any object maintained immobile, two-dimensional figures, letters or other identification marks.

BACKGROUND OF THE INVENTION

The invention envisages the devices of the type described in Patent EP-A-0 519 850 (TECHNIFOR). It will be recalled that, in these devices, the marking tool, of the micro-percussion type, is mounted axially at the end of a swivelling rod of which the opposite end penetrates inside a fixed casing through an articulated linkage capable of being formed both by a universal joint and by a simple ball-and-socket joint.

For controlling the orientation of the tool-holder rod, the casing contains an actuation mechanism which comprises two telescopic jacks oriented parallel to each other to act on two arms fixed radially on the rod and disposed perpendicularly to each other. One of the two elements of each jack is coupled by a ball-and-socket joint to the casing, whilst the other element is itself connected, by a ball-and-socket joint, to the end of the radial arm which corresponds thereto.

In one of the embodiments described in the prior document mentioned above, the two actuation jacks are oriented parallel to the axis of symmetry of the swivelling rod, being coupled to the wall of the casing opposite the one which bears the articulated linkage. It will be appreciated that, if this rod is retained angularly against any rotation along its axis, such an actuation mechanism ensures, under excellent conditions, control of the displacement of the tool.

However, it should be noted that such an arrangement further presents a substantial drawback, in that, further to the geometry of the assembly, any control exerted by one of the two jacks necessarily involves a correcting action applied to the other jack, and this even in the case of the device being used for marking rectilinear lines. Such permanent correction complicates the electronic equipment used for controlling the actuation mechanism.

It is an object of the present invention to overcome this drawback which, in practice, is not insignificant.

SUMMARY OF THE INVENTION the invention therefore relates to a marking device for producing two-dimensional identification marks on the surface of any object, of the type in which the micro-percussion tool is borne axially by a swivelling rod which is retained angularly along its axis and which penetrates in a fixed casing through an articulated linkage allowing free orientation thereof in all directions along an axis of symmetry, control of orientation of this rod being effected with the aid of two telescopic jacks which are oriented parallel to the said axis and of which one end is coupled by a ball-and-socket joint to one or the other of the two perpendicular arms radially fast with the rod and disposed in a plan transverse to said axis, whilst the opposite end is itself fixed by ball-and-socket joints to the casing, wherein the ball-and-socket joints are disposed in the plane transverse to the rod which passes through the centre of the articulated linkage.

In fact, the invention essentially consists in disposing in the plane transverse to the swivelling rod which intersects the centre of the articulated linkage (universal or ball-and-socket joint), the two ball-and-socket joints which ensure coupling of the telescopic jacks to the casing.

BRIEF DESCRIPTION OF THE DRAWINGS

The invention will be more readily understood on reading the following description with reference to the accompanying drawings, in which:

The single Figure schematically shows in perspective the arrangement of the mechanism for actuating a marking device according to the invention.

DESCRIPTION OF PREFERRED EMBODIMENT

Referring now to the drawing, reference 1 designates the swivelling rod which bears along its axis the micro-percussion tool 2, which is supplied pneumatically via a pipe 2a so that its mobile tip 2b marks the surface 3 of the object to be identified. Rod 1 penetrates inside a fixed casing 4 through an opening 4a in which is mounted the articulated linkage 5 which supports said rod 1, whilst enabling it to swivel freely in all directions with respect to its axis of symmetry X—X'.

In the embodiment considered, the articulated linkage 5 is constituted by a universal joint which comprises an inner ring 5a rigidly fast with rod 1 and connected by two opposite journals 5b to an outer ring 5c, itself joined to the casing 4 by two journals 5d oriented along an axis Y—Y' perpendicular to that Z—Z' of the journals 5b. In a variant, a ball-and-socket joint may be used, as long as it is arranged to retain the rod 1 angularly against any rotation along its axis, as is indicated in the prior art Patent mentioned in the preamble.

The actuation mechanism which controls orientation of rod 1 comprises, in the same manner as described in the prior art Patent, two telescopic jacks 6 which are oriented parallel to axis X—X' and which are coupled by ball-and-socket joints 7, 8 respectively, on the one hand, to casing 4, on the other hand, to the free end of two perpendicular arms 9 fixed radially to rod 1.

In accordances with the present invention, the arms 9 are disposed at such a distance from the opening 4a of the casing 4 that the jacks 6 may find room between said arms 9 and the wall of the casing which bears the articulated linkage 5. Under these conditions, the two ball-and-socket joints 7 may consequently be disposed in the plane transverse to rod 1 which passes through the centre 5' of the articulated linkage 5, which centre 5' obviously corresponds to the point of intersection of axes Y—Y' and Z—Z' mentioned above.

Consequently, due to the geometry thus defined, the production of a rectilinear marking line on surface 3 necessitates actuation of one jack 6, without any correcting action having to be made to the other jack. This arrangement obviously simplifies the electronic programmation which ensures automatic actuation of the two jacks of the mechanism.

It should be observed that the arms 9 may be of any orientation with respect to axes Y—Y' and Z—Z', as long as these two arms define a right angle and the centre of the ball-and-socket joints 7 is exactly disposed in the transverse plane which corresponds to the centre 5' of the articulated linkage 5.

What is claimed is:

1. Marking device for producing two-dimensional identification marks on a surface of an object, of the type in which a micro-percussion tool is borne axially by a swivelling rod which is retained angularly along its axis and which penetrates in a fixed casing through an articulated linkage allowing free orientation thereof in all directions along an axis of symmetry, control of orientation of the rod being effected with the aid of two telescopic jacks each of which is oriented parallel to said rod axis with one end coupled by a first ball-and-socket joint to a respective one of two perpendicular arms radially extending from the rod and disposed in a plane transverse to said rod axis, with the opposite end being fixed by a second ball-and-socket joint to the casing, wherein the second ball-and-socket joints are disposed in a plane transverse to the rod which passes through the center of the articulated linkage.

* * * * *